United States Patent
Koay et al.

(10) Patent No.: US 10,228,415 B1
(45) Date of Patent: Mar. 12, 2019

(54) APPARATUS AND METHOD FOR SECURITY IN AN INTEGRATED CIRCUIT

(71) Applicant: Altera Corporation, San Jose, CA (US)

(72) Inventors: Wei Yee Koay, Bayan Lepas (MY); Ting Lu, Austin, TX (US); Ka Bo Wong, Bayan Lepas (MY); Rajiv Kumar, Penang (MY)

(73) Assignee: Altera Corporation, San Jose, CA (US)

( * ) Notice: Subject to any disclaimer, the term of this patent is extended or adjusted under 35 U.S.C. 154(b) by 331 days.

(21) Appl. No.: 15/277,494

(22) Filed: Sep. 27, 2016

(51) Int. Cl.
  *G01R 31/28* (2006.01)
  *H03K 17/22* (2006.01)
  *H03K 19/177* (2006.01)
  *G01R 19/165* (2006.01)
  *G06F 21/87* (2013.01)

(52) U.S. Cl.
  CPC ....... *G01R 31/2832* (2013.01); *G01R 19/165* (2013.01); *G06F 21/87* (2013.01); *H03K 17/223* (2013.01); *H03K 19/1776* (2013.01)

(58) Field of Classification Search
  CPC ... G01R 31/2832; G01R 19/165; G06F 21/87; H03K 17/223; H03K 19/1776
  USPC ............................ 324/750.01, 537, 500
  See application file for complete search history.

(56) References Cited

U.S. PATENT DOCUMENTS

| | | | |
|---|---|---|---|
| 2012/0242380 A1* | 9/2012 | Edwards | G01R 31/30 327/143 |
| 2018/0191343 A1* | 7/2018 | Kowkutla | G05B 19/042 |
| 2018/0287603 A1* | 10/2018 | Subramanian | H03K 5/19 |

* cited by examiner

*Primary Examiner* — Giovanni Astacio-Oquendo
(74) *Attorney, Agent, or Firm* — Fletcher Yoder, P.C.

(57) ABSTRACT

Test circuitry for providing security in an integrated circuit includes a control circuit and a test power-on-reset circuit. The control circuit determines whether the integrated circuit is configured in a non-secure condition, and that generates a control signal in response to the non-secure condition. Accordingly, the test power-on-reset circuit selectively disables a power-on-reset circuit on the integrated circuit in response the control signal during test operations. The test power-on-reset circuit receives control instructions from the control circuit, and produces a test power-on-reset output according to the control instructions. The integrated circuit includes a logic gate that receives the test power-on-reset output and a power-on-reset signal from the power-on-reset circuit and generates an output signal for bypassing operations of the power-on-reset circuit on the integrated circuit.

20 Claims, 6 Drawing Sheets

APPARATUS AND METHOD FOR SECURITY IN AN INTEGRATED CIRCUIT

BACKGROUND

This disclosure relates to security in an integrated circuit device, particularly during power-up.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Integrated circuits are powered using power supply voltages. The power supply voltages may be supplied from an external source or may be derived from an external source using on-chip circuitry. When a power supply voltage that is provided to the integrated circuit is powered up, the integrated circuit is reset into a known state. The reset of the integrated circuit may be performed by a power-on-reset (POR) signal generated by a POR circuit. The POR signal is active during the POR phase of the initialization before the configuration stage where the user information is loaded into the integrated circuit.

Some integrated circuits include a test POR input pin used for testing how changes in the power supply affect the performance of the integrated circuit. In many cases, the POR signal is generated depending on the power supply voltage value. Thus, when the power supply voltage goes below a certain threshold voltage level, this may force the integrated circuit to go through a new POR sequence. To test the response of the integrated circuit to the fluctuations in power supply voltage, the test POR input overrides the POR signal to avoid the initialization of a new POR sequence when the power supply voltage falls below the threshold voltage level. However, such testing may pose a threat to the reliability and security of the integrated circuit. This is because the testing may potentially enable someone that uses the test POR input to override the operations of the POR circuit.

SUMMARY

In accordance with the present disclosure, apparatuses and methods are provided for security in an integrated circuit. A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

It should be appreciated that the present disclosure can be implemented in numerous ways, such as a process, an apparatus, a system, or a device. Several embodiments of the present disclosure are described below.

Circuitry is disclosed. The circuitry includes a power-on-reset circuit and test circuitry that includes a skewed latch circuit. The power-on-reset circuit may determines whether a power supply voltage of an integrated circuit is beneath a particular threshold and outputs a first control signal that indicates whether the power supply voltage is beneath the particular threshold. The test circuitry may determine whether the integrated circuit is in a first mode or a second mode. The test circuitry may generate a second control signal that indicates whether the skewed latch circuit is set to correspond to the first mode or the second mode. The first control signal and the second control signal may cause data utilization circuitry of the integrated circuit to be reset when the first control signal indicates that the power supply voltage is beneath the particular threshold and the second control signal indicates that the skewed latch circuit is set to correspond to the first mode, but not when the second control signal indicates that the skewed latch circuit is set to correspond to the second mode.

Test circuitry is disclosed. The test circuitry includes a control circuit and a test power-on-reset circuit. The test power-on-reset circuit includes a skewed latch circuit. The control circuit determines whether an integrated circuit is configured in a non-secure condition, and that generates a control signal in response to the non-secure condition. Accordingly, the test power-on-reset circuit selectively disables a power-on-reset circuit on the integrated circuit through the skewed latch circuit in response the control signal during test operations. The test power-on-reset circuit receives control instructions from the control circuit, and produces a test power-on-reset output according to the control instructions. The integrated circuit includes a logic gate that receives the test-power-on-reset output and a power-on-reset signal from the power-on-reset circuit and generates an output signal for bypassing operations of the power-on-reset circuit on the integrated circuit.

A method of testing an integrated circuit is disclosed. The method includes determining whether a power supply voltage of the integrated circuit meets a particular threshold during an operation of the integrated circuit using a control circuit. The control circuit further determines whether the integrated circuit is configured in a non-secure state. The method further includes selectively bypassing a power-on-reset circuit on the integrated circuit when the integrated circuit is configured in the non-secure state using a test power-on-reset circuit. To do so, an interface circuit may receive configuration data from the control circuit, where the configuration data includes an instruction to initiate operations on the test power-on-reset circuit. The power-on-reset circuit generates a test power-on-reset circuit output according to the instruction. The power-on-reset output may disable operations of the power-on-reset circuit on the integrated circuit using a logic circuit.

Further features of the disclosure, its nature and various advantages will be more apparent from the accompanying drawings and the following detailed description of the preferred embodiments. Indeed, various refinements of the features noted above may be made in relation to various aspects of the present disclosure. Further features may also be incorporated in these various aspects as well. These refinements and additional features may be made individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings.

DETAILED DESCRIPTION

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure. The embodiments provided herein include apparatuses and methods for security in an integrated circuit.

Figure 1:
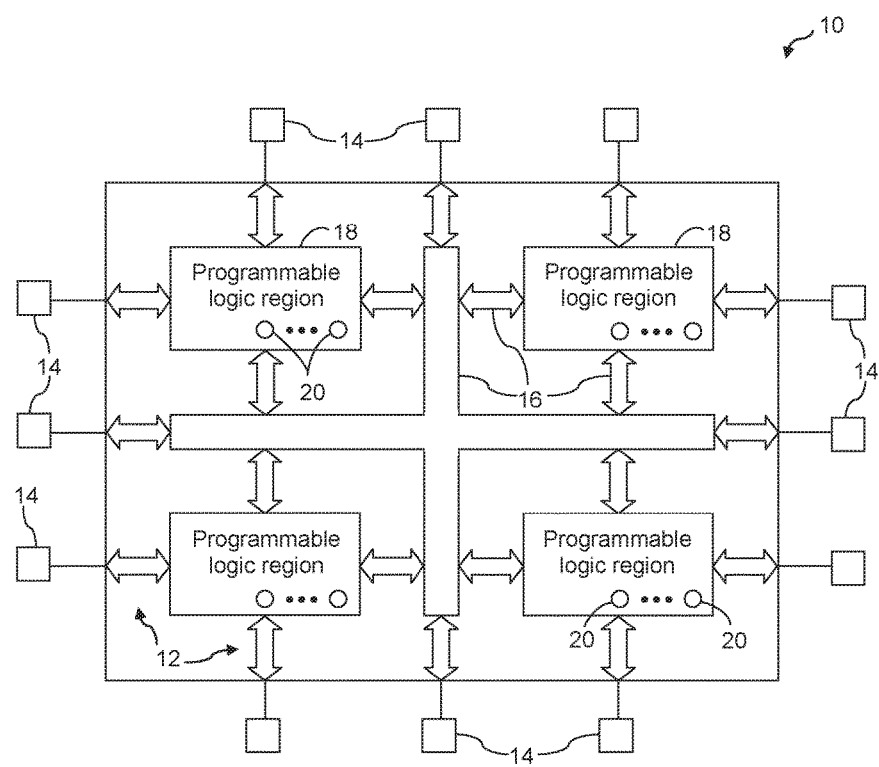
FIG. 1 shows a diagram of an illustrative integrated circuit in accordance with an embodiment of the present disclosure.

FIG. 1 shows a diagram of an illustrative integrated circuit 10 in accordance with an embodiment of the present disclosure. Integrated circuit 10 has input-output (IO) circuitry 12 for driving signals off of integrated circuit 10 and for receiving signals from other circuits or devices via 10 pins 14. Interconnection resources 16 such as global and local vertical and horizontal conductive lines and busses may be used to route signals on integrated circuit 10. Interconnection resources 16 include fixed interconnects (conductive lines) and programmable interconnects (e.g., programmable connections between respective fixed interconnects). The programmable interconnects associated with interconnection resources 16 may be considered to be a part of programmable logic regions 18.

Integrated circuit 10 contains volatile memory elements 20 that can be loaded with configuration data (also called programming data) using IO pins 14 and IO circuitry 12. Once loaded, the memory elements each provide a corresponding static control output signal that controls the state of an associated logic component in programmable logic 18. If desired, memory elements 20 may be used in SRAM-type memory arrays (e.g., to store data for processing circuitry during operation of integrated circuit 10).

Each memory element 20 may be formed from a number of transistors configured to form a bistable circuit. With one suitable approach, complementary metal-oxide-semiconductor (CMOS) integrated circuit technology is used to form the memory elements 20, so CMOS-based memory element implementations are described herein as an example. If desired, other integrated circuit technologies may be used to form the memory elements and the integrated circuit in which the memory elements are used to form memory arrays.

The memory elements may be loaded from an external erasable-programmable read-only memory and control chip or other suitable data source via IO pins 14 and IO circuitry 12. Loaded CRAM memory elements 20 may provide static control signals that are applied to the terminals (e.g., gates) of circuit elements (e.g., metal-oxide-semiconductor transistors) in programmable logic 18 to control those elements (e.g., to turn certain transistors on or off) and thereby configure the logic in programmable logic 18. The circuit elements may be transistors such as pass transistors, parts of multiplexers, look-up tables, logic arrays, AND, OR, NAND, and NOR logic gates, etc.

The memory elements 20 may be arranged in an array pattern. During programming operations, the array of memory elements may be provided with configuration data by a user (e.g., a logic designer). Once loaded with configuration data, the memory elements 20 selectively control portions of the circuitry in the programmable logic 18 and thereby customize its functions so that it will operate as desired.

The circuitry of integrated circuit 10 may be organized using any suitable architecture. As an example, the logic of integrated circuit 10 may be organized in a series of rows and columns of larger programmable logic regions each of which contains multiple smaller logic regions. The logic resources of integrated circuit 10 may be interconnected by interconnection resources 16 such as associated vertical and horizontal conductors. These conductors may include global conductive lines that span substantially all of integrated circuit 10, fractional lines such as half-lines or quarter lines that span part of integrated circuit 10, staggered lines of a particular length (e.g., sufficient to interconnect several logic areas), smaller local lines, or any other suitable interconnection resource arrangement. If desired, the logic of integrated circuit 10 may be arranged in more levels or layers in which multiple large regions are interconnected to form still larger portions of logic. Still other device arrangements may use logic that is not arranged in rows and columns.

Figure 2:
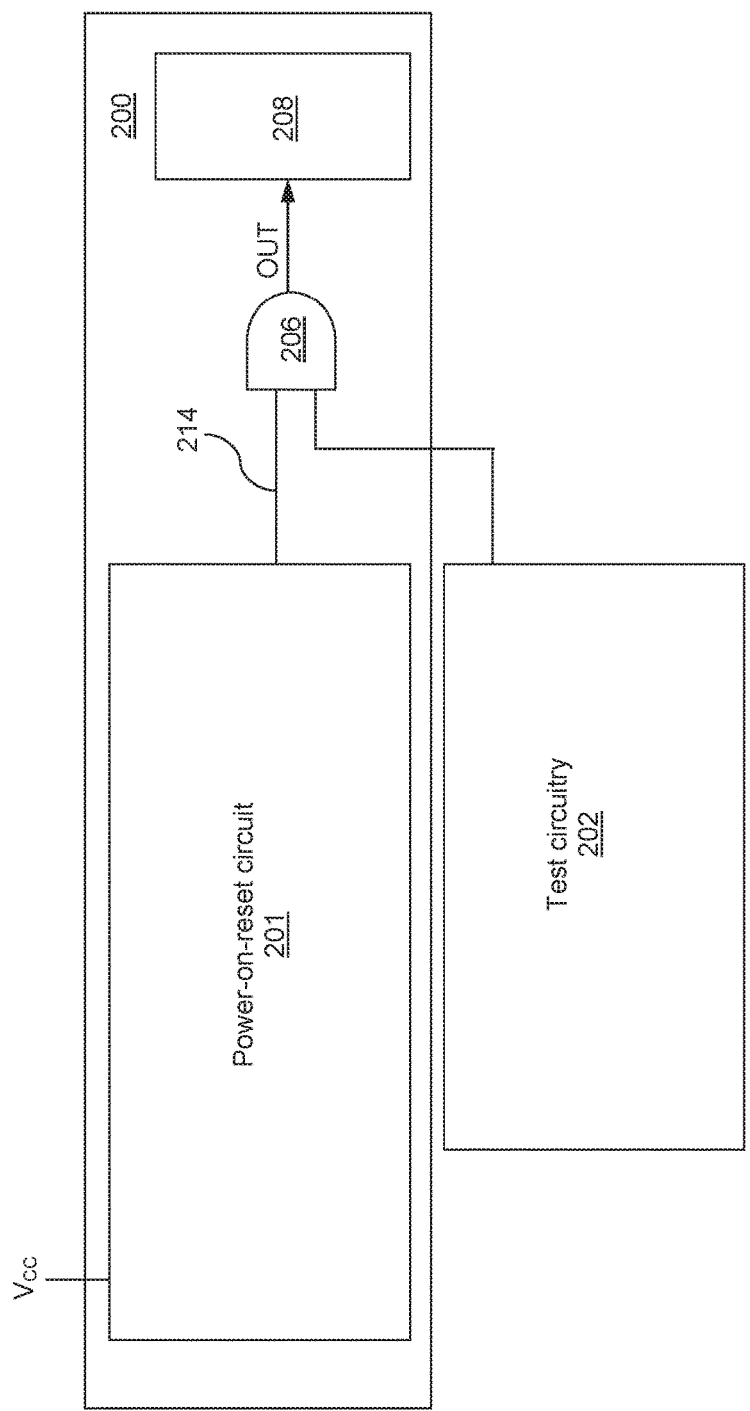
FIG. 2 shows a diagram of an illustrative integrated circuit having a power-on-reset circuit and test power-on-reset circuitry in accordance with an embodiment of the present disclosure.

FIG. 2 shows a diagram of an illustrative integrated circuit 200 having a power-on-reset circuit and test power-on-reset circuitry in accordance with an embodiment of the present disclosure. Integrated circuit 200 (IC 200) may operate in a manner similar to integrated circuit 10 shown in FIG. 1, and thus, may provide substantially the same functionality. As show in FIG. 2, IC 200 includes power-on-reset (POR) circuit 201. Test POR circuitry such as test circuitry 202 may couple to POR circuit 201. In one embodiment, test circuitry 202 may be external to IC 200. The outputs of POR circuit 201 and test circuitry 202 are gated by a logic circuit (e.g., AND gate 206) to provide an output signal (e.g., OUT signal) to data utilization circuitry 208 of IC 200. In one embodiment, data utilization circuitry 208 may include programmable logic that is similar to programmable logic 18 of FIG. 1.

In a typical scenario, IC 200 may be mounted on a circuit board (not shown) in a system. A power supply voltage (e.g., $V_{CC}$) is supplied to IC 200 through IO pins, such as IO pins 14 shown in FIG. 1. To prevent damage to circuitry on IC 200, a power-on-reset (POR) circuit (e.g., POR circuit 201) monitors power supply voltage $V_{CC}$, which may be dynamically powered up or down during user operation of IC 200. As examples, POR circuit 201 can be one of a variety of different types of POR circuits, or a combination of POR circuits, such as VTPOR (VT POR, where VT is the transistor threshold voltage) and BGPOR (Bandgap POR). It should be appreciated that POR circuit 201 is shown in simplified form in FIG. 2, and is not meant to be limiting.

When POR circuit 201 determines that power supply voltage $V_{CC}$ has attained intended sufficient operating voltage level, POR circuit 201 generates a corresponding POR signal (e.g., POR signal 214). In a conventional integrated circuit, a test POR input pin may be used for testing and debugging the integrated circuit when power supply voltage $V_{CC}$ is powered up. For instance, the test POR input may override POR signal 214 to avoid the initialization of a new POR sequence when power supply voltage $V_{CC}$ falls below a particular threshold voltage level in order to allow a low voltage test to be conducted on IC 200. However, during normal operation, the accessibility of the test POR input may pose a threat to the integrated circuit's reliability and security. This is because the low voltage test may potentially enable someone that uses the test POR input to override the operations of the POR circuit.

In order to prevent the above-mentioned problem, a secure testing mechanism such as test circuitry 202 may be used. Test circuitry 202 may determine a configuration state of IC 200 before allowing a user to override the POR functionality to perform the low voltage testing of IC 200. Once the configuration state of IC 200 is determined, test circuitry 202, which will be described in detail below, is put in place to ensure that the testing of the integrated circuit can be conducted in a secure manner.

Figure 3:
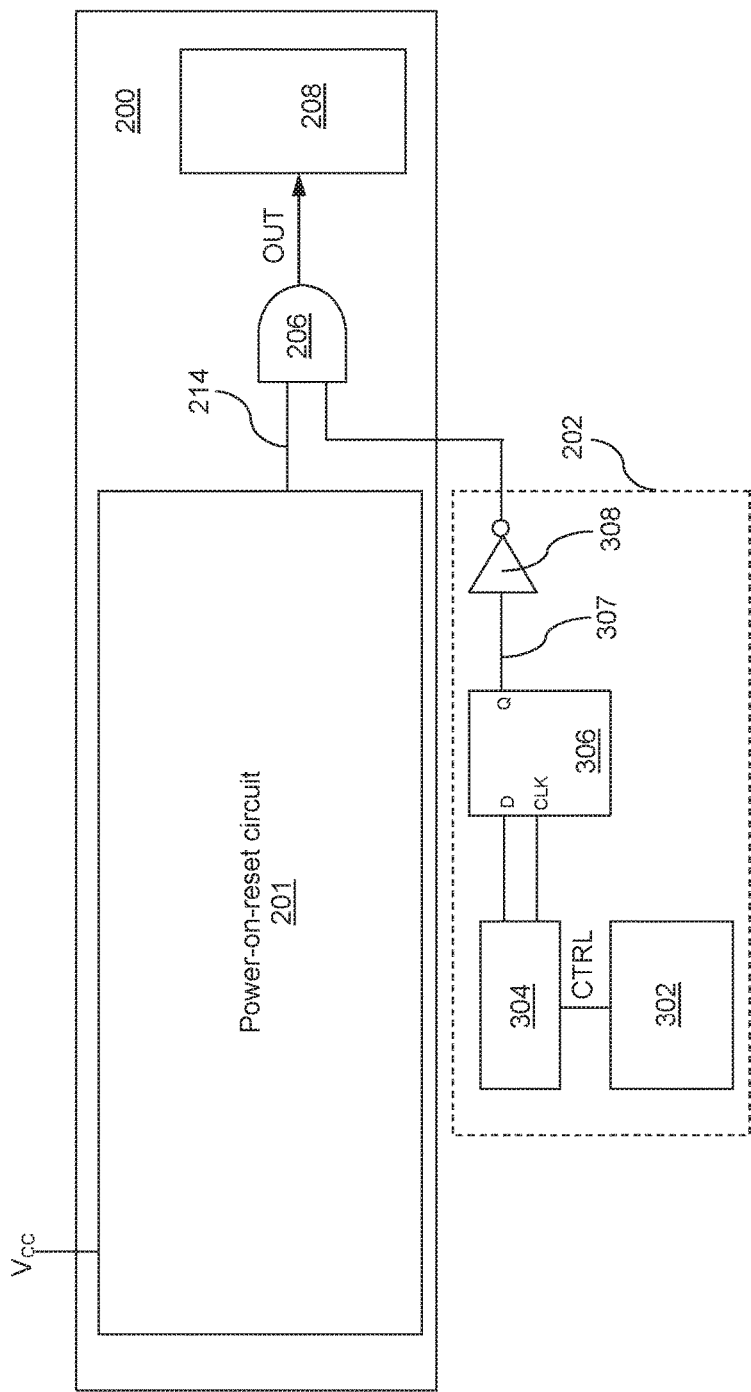
FIG. 3 shows a detailed diagram of an illustrative integrated circuit in accordance with an embodiment of the present disclosure.

FIG. 3 shows a detailed diagram of integrated circuit 200 (IC 200) of FIG. 2 in accordance with an embodiment of the present disclosure. As described above, IC 200 may include power-on-reset circuit 201 and test circuitry 202, which is coupled to IC 200. As shown in FIG. 3, test circuitry 202 includes control circuit 302 and test power-on-reset (POR) circuit 306. In one embodiment, test POR circuit 306 may replace a conventional test POR input pin to override a POR signal (e.g., POR signal 214) that is generated by POR circuit 201. For example, test POR circuit 306 may be a register circuit. In one embodiment an interface circuit 304 may be used to allow control circuit 304 to communicate with test POR circuit 306. For example, interface circuit 304 may be a Joint-Test Action Group (JTAG) interface circuit.

In the illustrated embodiment, IC 200 can be configured in a secure or non-secure state. When IC 200 is configured in a secure state, IC 200 is said to be in a normal operating mode. In this mode, power-on-reset (POR) circuit 201 may monitor power supply voltage $V_{CC}$ that is supplied to IC 200 when power supply voltage $V_{CC}$ is powered up. However, when power supply voltage $V_{CC}$ is beneath a particular threshold voltage level, POR circuit 201 may initiate a sequence of POR signal 214 that may inhibit or reset the operation of IC 200 until power supply voltage $V_{CC}$ reaches an intended sufficient operating voltage level.

In the case when IC 200 is configured in a non-secure state, IC 200 is said to be in a test operating mode. In this mode, a user may enable low voltage testing and characterization on IC 200 through test circuitry 202 whenever POR circuit 201 detects that the voltage level falls below the particular threshold voltage level during normal operation of IC 200. In order to ensure the reliability and security of IC 200 during the test operating mode, test circuitry 202 may perform a security check using control circuit 302 to determine a configuration state of IC 200 prior to enabling the low voltage testing on IC 200. For example, the configuration state of IC 200 may be determined based on detected operational parameters that are stored in a storage circuit (not shown) in IC 200.

In one scenario, when control circuit 302 determines that IC 200 is configured in a secure state, control circuit 302 may disable test POR circuit 306 (e.g., set to logic level "0") to prevent loading of configuration data that will override POR signal 214. In this scenario, test circuitry 202 may generate a test POR signal (e.g., test POR signal 307) using test POR circuit 306. The resulting test POR signal 307 is then sent to an input of an inverter circuit 308. Inverter circuit 308 may invert the logic value of test POR signal 307 and outputs this inverted value to one of the inputs of a logic gate, such as AND gate 206. When POR signal 214 and the inverted value of inverter circuit 308 are asserted (e.g., both having a logic value "1"), the output of AND gate 206 may indicate that IC 200 is operating in the secure state and that POR circuit 201 may operate as normal without being interrupted by test POR circuit 306. One of ordinary skill in the art will recognize that other combinations of logical values and logic functions may be used to allow the test POR signal 307 to disable the POR signal 214. Such a configuration provides security to IC 200 to prevent potential tampering of IC 200 by someone that would seek to use the test POR circuit 306 to override the operations of POR circuit 201.

In another scenario, when control circuit 302 determines that IC 200 is configured in a non-secure state, control circuit 302 may generate (or produce) a control signal (e.g. CTRL signal) that indicates the non-secure configuration state of IC 200. In response to the CTRL signal, an interface circuit (e.g., interface circuit 304) may receive control instructions from control circuit 302. In one embodiment, the control instructions may include configuration data and a clock signal that enables the operations of test POR circuit 306. For example, control circuit 302 may feed the configuration data to a D-terminal of test POR circuit 306 through interface circuit 304.

Once the configuration data is communicated to test POR circuit 306, test POR circuit 306 may send a test POR circuit output (e.g., test POR signal 307) from a Q-terminal of test POR circuit 306 to inverter circuit 308. Inverter circuit 308 may generate an inverted version of test POR signal 307 (e.g., signal 312) to one of the inputs of AND gate 206. Accordingly, when the voltage level falls below the particular threshold voltage level, POR circuit 201 may communicate POR signal 214 to another one of the inputs of AND gate 206. In a scenario where the IC is operating in the non-secure state, the inverted version of test POR signal 207 generated by inverter circuit 308 will cause the AND gate 206 to disable its output and therefore, overriding POR circuit 201 in order to facilitate the low voltage testing of IC 200. One of ordinary skill in the art will recognize that other gating logic may be used in lieu of AND gate 206 and thus any of the described signals may be asserted (either active high or active low) depending on the specific embodiment.

Figure 4:
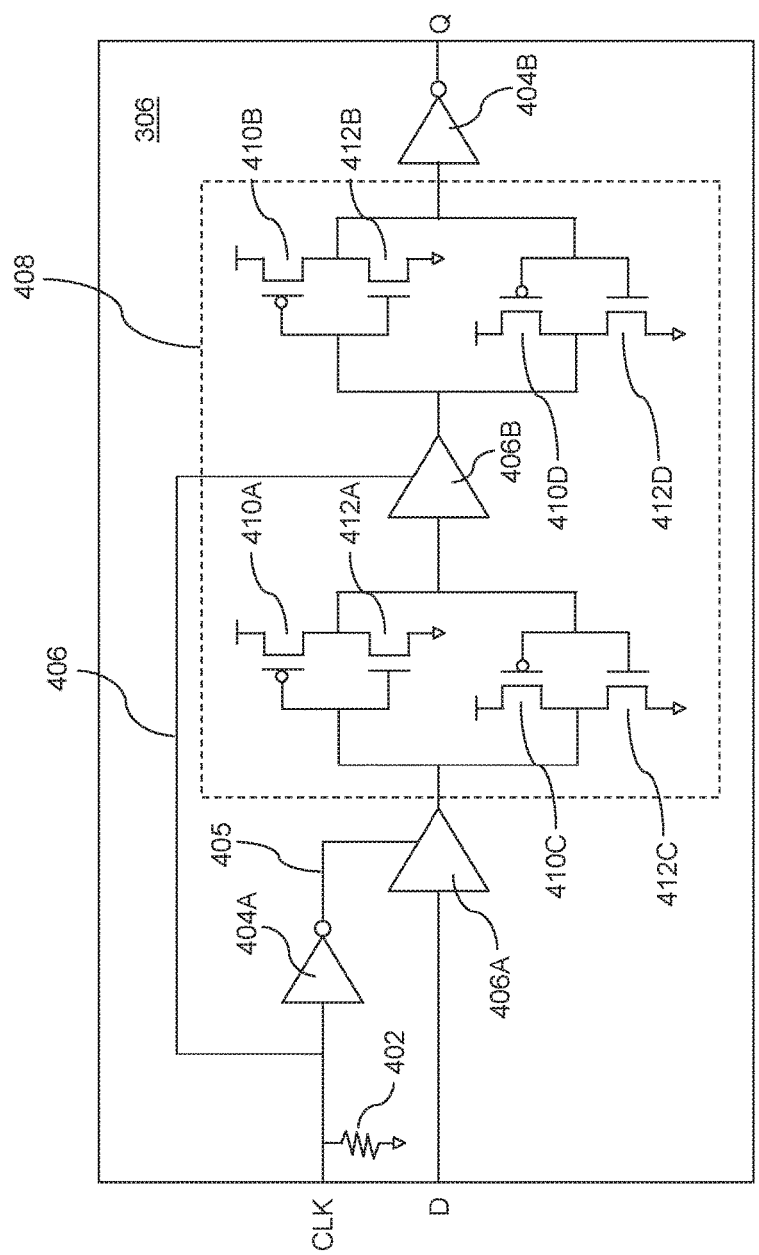
FIG. 4 shows a circuit diagram of a test power-on-reset circuit in in accordance with an embodiment of the present disclosure.

FIG. 4 shows a circuit diagram of test power-on-reset (POR) circuit 306 of integrated circuit (IC) 200 of FIGS. 2 and 3 in accordance with an embodiment of the present disclosure. As described above, test POR circuit 306 is controlled by control circuit 302 to selectively bypass the operations of POR circuit 201 to facilitate low voltage testing of IC 200. For example, test POR circuit 306 may include a register circuit.

As shown in FIG. 4, test POR circuit 306 has an input (D) that receives an input value, and can latch data in response to a clock signal (or CLK signal). Test POR circuit 306 further includes a skewed latch (e.g. latch circuit 408). Latch circuit 408 includes PMOS transistors 410A, 410B, 410C, and 410D, and NMOS transistors 412A, 412B, 412C, and 412D. Each of PMOS transistor 410A, 410B, 410C, and 410D has one terminal connected to a voltage source (also referred to as "connected to high"), and another terminal connected to a terminal of NMOS transistors 412A, 412B, 412C, and 412D, respectively. Accordingly, each of NMOS transistors 412A, 412B, 412C, and 410D has another terminal connected to a ground source (also referred to as "connected to low"). CLK signal may selectively control buffer circuit 406A to ensure that input D is properly latched by latch circuit 408 using inverter 404A. CLK signal may also control buffer circuit 406B to drive internal circuits of latch circuit 408.

During normal operation of IC 200, power supply voltage $V_{CC}$ of FIGS. 2 and 3 may dynamically ramp up towards intended sufficient operating voltage level to perform user-defined operations. In this scenario, test POR circuit 306 may attain a random logic state (i.e., either a logic value of "1" or logic value of "0") until test POR circuit 306 is being reset. However, in the case when test POR circuit 306 outputs a logic value of "1", POR circuit 201 may be bypassed before control circuit 302 completes a security check on a configuration state of IC 200, which is potentially hazardous to IC 200 of FIGS. 2 and 3. In order to ensure that the output of test POR circuit 306 is at logic value of "0" upon power-up of the power supply voltage, a weak pull-down resistor (e.g., pull-down resistor 402) is provided at the CLK input pin of test POR circuit 306. Such a configuration ensures that the CLK signal that arrives at CLK input pin is prevented from floating when the power supply voltage has not met a particular threshold voltage level.

Additionally, latch circuit 408 is skewed by the PMOS transistors 410A-410D and NMOS transistors 412A-412D, as the PMOS and NMOS transistors may have different driving strengths. For example, PMOS transistors 410A and 410B and NMOS transistors 412C and 412D of latch circuit 408 may provide a higher driving strength than that of PMOS transistors 410C and 410D and NMOS transistors 412C and 412D. Such a configuration ensures that the trip point of latch circuit 408 stays low, which allows latch circuit 408 to establish in a deterministic (or predictable) logic state (i.e., logic value of "0") instead of the random logic state upon the power-up of the power supply voltage. As such, test POR circuit 306 may be referred to as a skewed register circuit. Subsequently, latch circuit 408 may generate an output signal to inverter 404B, and test POR signal 307 of FIG. 3 is its resulting signal at a Q-terminal of test POR circuit 306.

Figure 5:
FIG. 5 shows a graph that plots the outputs of a conventional register circuit and a skew register circuit in accordance with an embodiment of the present disclosure.

FIG. 5 shows graph 500 that plots the outputs of a conventional register circuit and a skewed register circuit in accordance with an embodiment of the present disclosure. As shown, Q1 may illustrate a register output of a conventional register circuit. Accordingly, Q2 may illustrate a register output of the skewed register circuit that includes latch circuit 408.

In an exemplary embodiment, a power supply voltage (e.g., power supply voltage $V_{CC}$ of FIGS. 2 and 3) that is supplied to an integrated circuit (e.g., IC 200 of FIGS. 2 and 3) may be ramped up towards a desired user operating voltage. This is depicted in the top graph of FIG. 5 as a function of $V_{CC}$ vs time (T). However, the output (e.g., Q1) of a conventional register circuit may randomly settle at logic value "1" or "0" due to transistor variation in the conventional register circuit. This can be seen in the middle graph of FIG. 5, showing an indeterminate signal during the early ramping period of $V_{CC}$, ultimately resulting in either a "0" or a "1" depending on the particular properties of the register's transistors.

To solve this problem, the skewed register circuit such as in test POR circuit 306 of FIGS. 3 and 4 may be used to establish a stable and predictable logic state (i.e., logic value of "0") instead of the random logic state during power-up of $V_{CC}$. For example, as described above in FIG. 4, skewed latch circuit 408 in test POR circuit 306 may ensure that the trip point of latch circuit 408 is constantly pulled down. Such a configuration allows test POR circuit 306 to establish a stable and predictable logic state (i.e., logic value of "0") instead of the random logic state during power-up of $V_{CC}$. This can be seen in the bottom graph of FIG. 5, where ultimately the output Q2 is consistently pulled to "0" as $V_{CC}$ ramps up.

Figure 6:
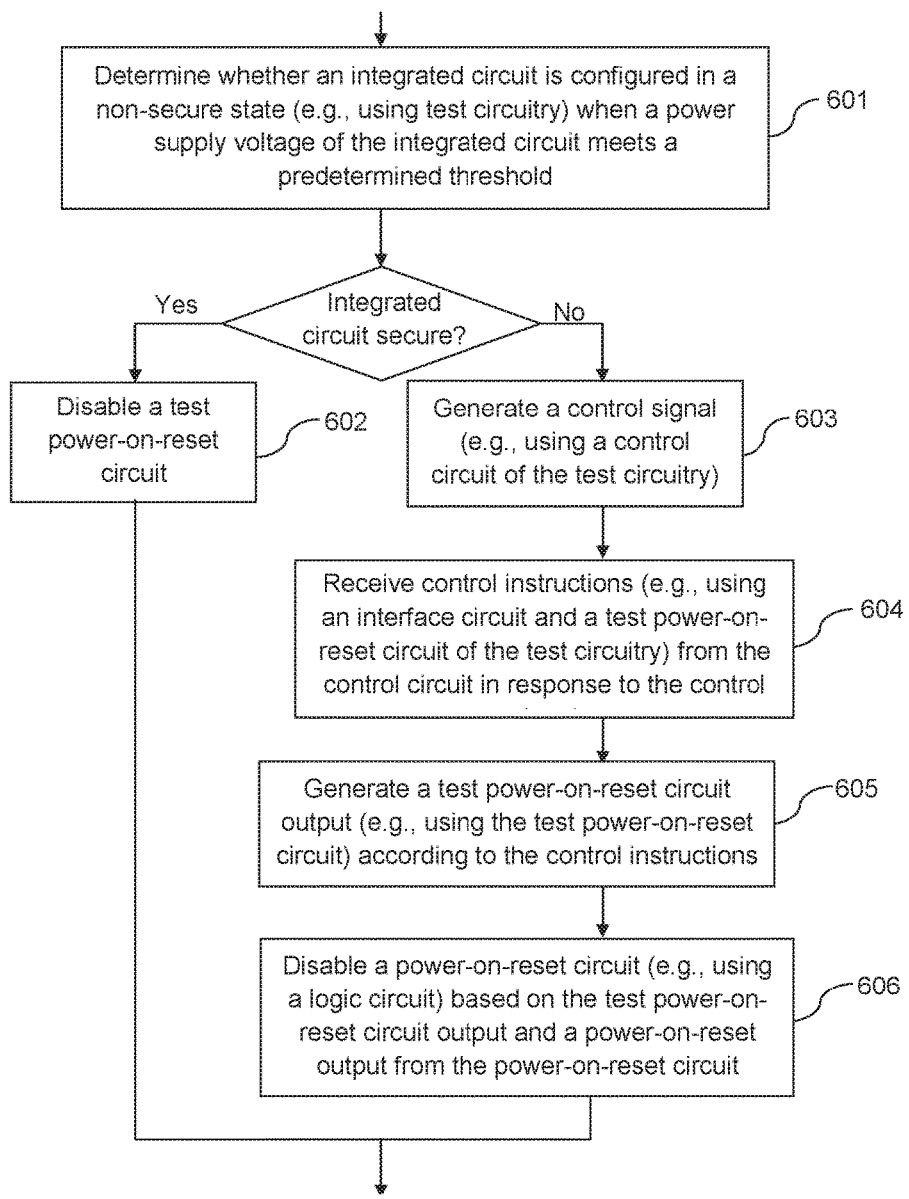
FIG. 6 shows a flow chart of illustrative acts to secure an integrated circuit with test power-on-reset circuitry in accordance with an embodiment of the present disclosure.

FIG. 6 shows a flow chart of illustrative acts for securing an integrated circuit with test power-on-reset (POR) circuitry in accordance with an embodiment of the present disclosure. It should be appreciated that the embodiments of FIGS. 2 and 3 may be used as examples implementing the actions described below.

When a power supply voltage that is provided to the integrated circuit is powered up, the integrated circuit and the test POR circuitry (or test circuitry) may be reset to known states upon power-up. This is to ensure proper operations when the power supply voltage reaches its normal operating level. For example, as shown in FIG. 3, test power-on-reset (POR) circuit 306 of test circuitry 202 may be reset and its Q output is at logic value of "0" upon power-up of integrated circuit 200 (IC 200).

At block 601, it is determined whether the integrated circuit is configured in a non-secure state when the power supply voltage of the integrated circuit meets a particular threshold. As shown in FIG. 3, test circuitry 202 may perform a security check using control circuit 302 by determining a configuration state of IC 200 based on operational parameters that are stored in a storage circuit of IC 200. In one embodiment, the power supply voltage (e.g., power supply voltage $V_{CC}$ of FIGS. 2 and 3) may be dynamically powered up or down during user operation of the integrated circuit.

If the integrated circuit is determined to be in a secure state, the test POR circuit (e.g., test POR circuit 306 of FIG. 3) of the test circuitry may be disabled from loading any data from the control circuit at block 602. This may prevent tampering with the integrated circuit via any potential exploits using the test POR circuit. However, if the integrated circuit is determined to be in a non-secure state, the test POR circuit will be enabled to receive data from the control circuit. If in a non-secure state, a control signal will be generated using the control circuit at block 603. For example, as shown in FIG. 3, control circuit 302 may generate a control signal (e.g., CTRL signal) that indicates the non-secure configuration state of IC 200. In response to CTRL signal, test POR circuit 306 may receive control instructions from control circuit 302 through an interface circuit (e.g., interface circuit 304) at block 604. For example, test POR circuit 306 may receive the configuration data from control circuit 302 through interface circuit 304.

At block 605, a test power-on-reset circuit output is generated according to the control instructions using the test power-on-reset circuit. As shown in FIG. 3, test POR circuit 306 may produce a test POR circuit output (e.g., test POR signal 307) after the configuration data is written into test POR circuit 306. The resulting test POR signal 307 is then inverted by inverter circuit 308 and then supplied to one of the inputs of a logic circuit, such as AND gate 206. In one embodiment, AND gate 206 may also be referred to as logic gate 206.

At block 606, a power-on-reset circuit is disabled based on the test power-on-reset output and the power-on-reset output from the power-on-reset circuit using a logic circuit. As shown in FIG. 3, POR circuit 201 may assert POR signal 214 to another one of the inputs of AND gate 206 when the voltage level falls below an operating voltage threshold. In this scenario, AND gate 206 may provide an output signal (e.g., OUT signal) based on POR signal 214 and test POR signal 307 that will bypass or override the operations of POR circuit 201 to ensure that testing can be performed on IC 200 in a secure manner.

The methods and apparatus described herein may be incorporated into any suitable circuit. For example, the methods and apparatus may be incorporated into numerous types of devices such as microprocessors or other integrated circuits. Exemplary integrated circuits include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), just to name a few. Furthermore, one of ordinary skill in the art will recognize that the disclosure does not rely on any particular active-high or active-low circuitry, and such signaling conventions may be determined based on the ultimate circuit constructed.

The integrated circuit described herein may be part of a data processing system that includes one or more of the following components: a processor; memory; IO circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

While the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. Circuitry comprising:
a power-on-reset circuit that determines whether a power supply voltage of an integrated circuit is beneath a particular threshold and outputs a first control signal that indicates whether the power supply voltage is beneath the particular threshold; and
test circuitry having a skewed latch circuit that determines whether the integrated circuit is in a first mode or a second mode, wherein the test circuitry generates a second control signal that indicates whether the skewed latch circuit is set to correspond to the first mode or the second mode;
wherein the first control signal and the second control signal cause data utilization circuitry of the integrated circuit to be reset when the first control signal indicates that the power supply voltage is beneath the particular threshold and the second control signal indicates that the skewed latch circuit is set to correspond the first mode, but not when the second control signal indicates that the skewed latch circuit is set to correspond the second mode.

2. The circuitry defined in claim 1, wherein the test circuitry comprises:
a control circuit that produces the second control signal, wherein the second control signal indicates a secure configuration state or a non-secure configuration state of the integrated circuit.

3. The circuitry defined in claim 2, wherein the test circuitry comprising:
a test power-on-reset circuit for selectively disabling the power-on-reset circuit on the integrated circuit when the second control signal indicates the secure configuration state of the integrated circuit.

4. The circuitry defined in claim 3, wherein the test power-on-reset circuit comprises the skewed latch circuit.

5. The circuitry defined in claim 3, wherein the test power-on-reset circuit receives control instructions from the control circuit and generates a test power-on-reset signal according to the control instructions.

6. The circuitry defined in claim 5, comprising:
a logic circuit having a first input that receives a power-on-reset signal from the power-on-reset circuit and a second input that receives the test power-on-reset signal from the test-power-on-reset circuit, and produces an output signal that controls the data utilization circuitry of the integrated circuit.

7. The circuitry defined in claim 3, comprising:
an interface circuit that provides access for the control circuit to the test power-on-reset circuit.

8. The circuitry defined in claim 7, wherein the interface circuit comprises a Joint-Test Action Group (JTAG) interface circuit.

9. The circuitry defined in claim 1, wherein the first mode comprises a normal operating mode, and the second mode comprises a test operating mode.

10. The circuitry defined in claim 1, wherein the data utilization circuitry of the integrated circuit comprises programmable logic.

11. Testing circuitry, comprising:
a control circuit that determines whether an integrated circuit is configured in a non-secure condition, and that generates a control signal in response to the non-secure condition; and
a test power-on-reset circuit having a skewed latch circuit that selectively disables a power-on-reset circuit on the integrated circuit in response the control signal during a test operation of the integrated circuit.

12. The testing circuitry defined in claim 11, wherein the test power-on-reset circuit comprises a register circuit.

13. The testing circuitry defined in claim 11, wherein the test power-on-reset circuit receives control instructions from the control circuit, and produces a test-power-on-reset output in response to a setting of the skewed latch circuit that corresponds to the control instructions.

14. The testing circuitry defined in claim 13, wherein the test power-on-reset circuit receives the control instructions from the control circuit through an interface circuit.

15. The testing circuitry defined in claim 14, wherein the integrated circuit comprises a logic gate that receives the test-power-on-reset output and a power-on-reset signal from the power-on-reset circuit and generates an output signal for bypassing operations of the power-on-reset circuit on the integrated circuit.

16. A method of testing an integrated circuit, comprising:
with a control circuit, determining whether a power supply voltage of the integrated circuit meets a particular threshold during an operation of the integrated circuit;
with the control circuit, determining whether the integrated circuit is configured in a non-secure state; and
with a test power-on-reset circuit, selectively bypassing a power-on-reset circuit on the integrated circuit when the integrated circuit is configured in the non-secure state.

17. The method defined in claim 16, comprising:
with the control circuit, generating a control signal indicative that the integrated circuit is configured in the non-secure state.

18. The method defined in claim 17, comprising:
with an interface circuit, receiving configuration data from the control circuit in response to the control signal, wherein the configuration data includes an instruction to initiate operations on the test power-on-reset circuit.

19. The method defined in claim 18, comprising:
with the test power-on-reset circuit, generating a test power-on-reset circuit output according to the instruction.

20. The method defined in claim 19, comprising:
with a logic circuit, receiving the test power-on-reset circuit output and a power-on-reset output from the power-on-reset circuit, and disabling operations of the power-on-reset circuit on the integrated circuit based on the test power-on-reset circuit output and the power-on-reset output.

* * * * *